(12) United States Patent
Silva et al.

(10) Patent No.: US 11,653,629 B2
(45) Date of Patent: May 23, 2023

(54) PROACTIVE DETECTION OF INVASIVE SPECIES

(71) Applicant: KYNDRYL, INC., New York, NY (US)

(72) Inventors: Alison Antonio Silva, Atibaia (BR); Ariane Hernandes Amadeu, Nova Odessa (BR); Douglas Cristiano Alves, Timóteo (BR); Marcos Vinicius L. Paraiso, Campinas (BR)

(73) Assignee: KYNDRYL, INC., New York, NY (US)

(*) Notice: Subject to any disclaimer, the term of this patent is extended or adjusted under 35 U.S.C. 154(b) by 9 days.

(21) Appl. No.: 17/361,458

(22) Filed: Jun. 29, 2021

(65) Prior Publication Data

US 2022/0408692 A1     Dec. 29, 2022

(51) Int. Cl.
*A01K 11/00*     (2006.01)
*G06V 10/20*     (2022.01)
*G06V 20/13*     (2022.01)

(52) U.S. Cl.
CPC .......... *A01K 11/008* (2013.01); *A01K 11/006* (2013.01); *G06V 10/255* (2022.01); *G06V 20/13* (2022.01)

(58) Field of Classification Search
CPC ..... G06V 20/13; G06V 20/255; A01K 11/006
See application file for complete search history.

(56) References Cited

U.S. PATENT DOCUMENTS

| | | | |
|---|---|---|---|
| 9,984,455 B1* | 5/2018 | Fox | G01N 1/02 |
| 10,045,523 B2 | 8/2018 | Ehrlich et al. | |
| 2012/0210644 A1* | 8/2012 | Johnson | G06N 5/02 47/1.01 R |
| 2018/0260627 A1 | 9/2018 | Wiand | |
| 2020/0012868 A1* | 1/2020 | Hong | G06V 20/56 |
| 2021/0081959 A1* | 3/2021 | Sweeney | G01V 1/001 |

FOREIGN PATENT DOCUMENTS

KR     102182073 B1     11/2020

OTHER PUBLICATIONS

Herder et al, Environmental DNA review, 2014 (Year: 2014).*
Angles dAuriac, et al., "Detection of an invasive aquatic plant in natural water bodies using environmental DNA." Published Jul. 12, 2019. 15 pages. Published by PLOS One. https://journals.plos.org/plosone/article?id=10.1371/journal.pone.0219700.
Coxworth, "Aquatic drone drops its camera to look for fish." Published Aug. 25, 2020. Printed Jun. 18, 2021. 9 pages. Published by New Atlas, https://newatlas.com/drones/chasing-fl-fish-finder-drone/.

(Continued)

*Primary Examiner* — Benyam Haile
(74) *Attorney, Agent, or Firm* — Kyndryl, Inc

(57) ABSTRACT

A system may include a memory and a processor in communication with the memory. The processor may be configured to perform operations to accept ecosystem data and detect, analyze, and notify a user about a species in an environment. The system analysis and notification may include impact determination of the species on the environment and shall learn from the received and analyzed data, bringing intelligence to the system.

20 Claims, 7 Drawing Sheets

(56) References Cited

OTHER PUBLICATIONS

Darrigran, et al., "Strategies and Measures to Prevent Spread of Invasive Species." Published May 24, 2015. 16 pages. Published by Research Gate. https://www.researchgate.net/publication/277077683_.

Genovesi, et al., "Guidelines for Addressing Invasive Species in Protected Areas." Published Jan. 19, 2014. 21 pages. Published by Research Gate. https://www.researchgate.net/publication/259762960_.

Mell, et al., "The NIST Definition of Cloud Computing," Recommendations of the National Institute of Standards and Technology, U.S. Department of Commerce, Special Publication 800-145, Sep. 2011, 7 pgs.

Meng, et al., "Underwater-Drone With Panoramic Camera for Automatic Fish Recognition Based on Deep Learning." Published Mar. 28, 2018. 7 pages. In IEEE Access, Special Section on Multimedia Analysis for Internet-of-Things. vol. 6. pp. 17880-17886. Published by IEEE. https://ieeexplore.ieee.org/stamp/stamp.jsp?arnumber=8327594.

* cited by examiner

PROACTIVE DETECTION OF INVASIVE SPECIES

BACKGROUND

The present disclosure relates to environmental changes and, more specifically, to species detection.

Introduction of non-native species to an environment can impact that environment. Some non-native species can adapt to the environments they are introduced into and have an advantage in reproduction and dispersion over native species because native species have natural predators. This can result in changes to the environments non-native species are introduced into.

SUMMARY

Embodiments of the present disclosure include a system, method, and computer program product for detection of invasive species.

A system may include a memory and a processor in communication with the memory. The processor may be configured to perform operations. The operations may include accepting data and analyzing the data against a database. The operations may also include detecting, based on the data and the database, a species in an environment. The operations may further include identifying an impact of the species on the environment and notifying a contact of the species and the impact of the species.

The above summary is not intended to describe each illustrated embodiment or every implement of the disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
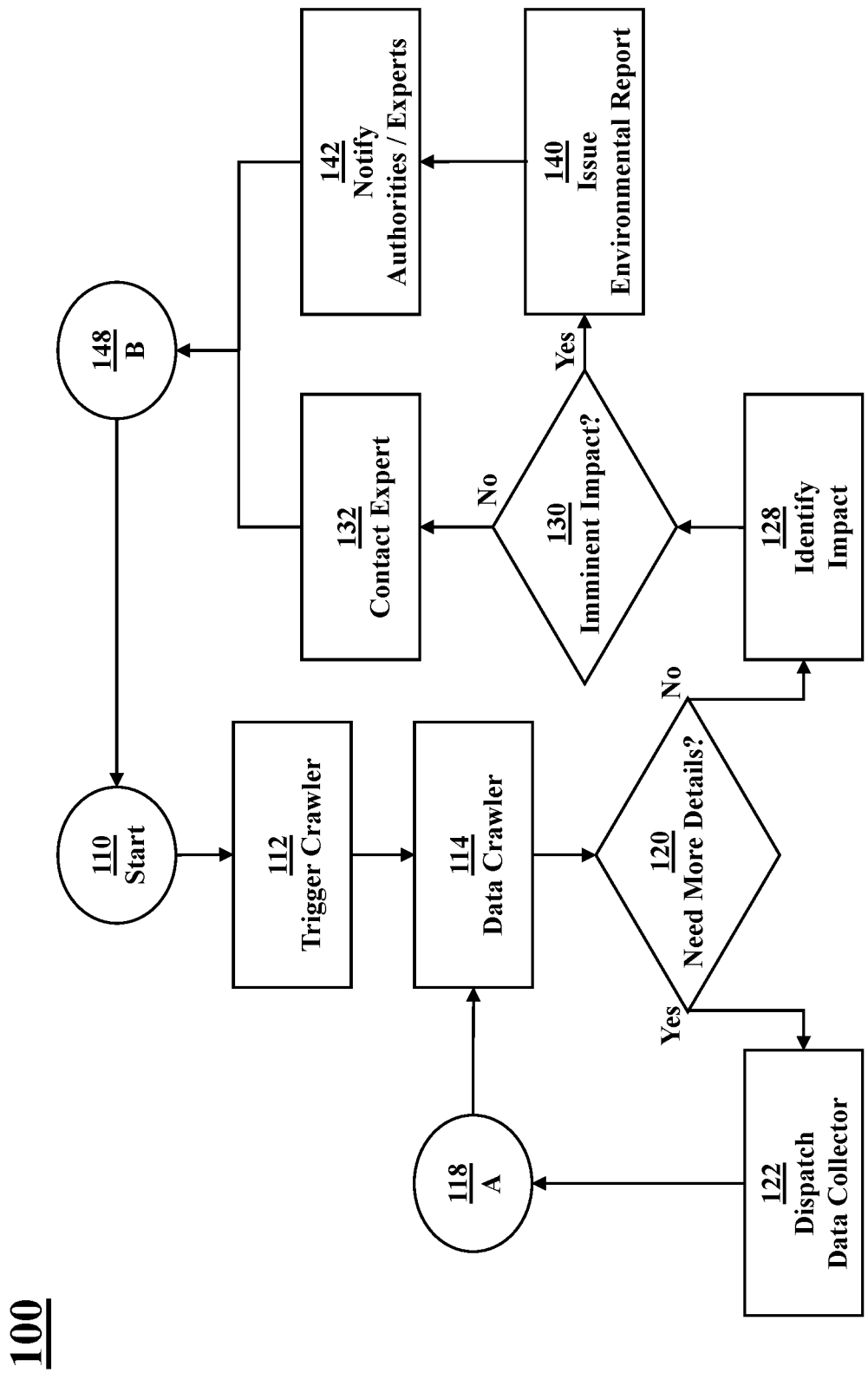
FIG. 1 illustrates a flow diagram for detection in accordance with some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to environmental changes and, more specifically, to species detection.

Balanced ecosystems are fundamental for the well-being of life. Invasive and other non-native species can spread quickly, threatening or eliminating the lives of native species in an environment, altering the biodiversity of a biome and affecting everyone who benefits from the area. Non-native species may quickly adapt and reproduce in the area, resulting in harm to native wildlife, human health, and the local economy.

The present disclosure offers a method to identify invasive species in a biome that could impact native species in the local environment. The present disclosure includes the use of a system that may alert experts, authorities, local residents, and the like. The present disclosure may be used to analyze a predefined set of information collected by environment agencies, colleges, and companies. Data for the present disclosure may be collected via satellite, drone, social media, research databases, and others. The present disclosure enables using a model to analyze data collected from one or more sources of information and send alerts concerning the identified invasive species and the risks of the invasive species to the environment. Risk to the environment may be identified depending on the non-native or invasive species identified, and notifications may be used simply for information or to counter a major risk to the environment.

The present disclosure may help environmental agencies to make decisions and act to reduce or eliminate environmental impact caused by non-native or invasive species. The present disclosure may be used to save native species, to support endangered species, and to avoid human health issues. The present disclosure identifies invasive species in an environment quickly and is capable of providing automated suggestions of actions to be taken based on machine learning (ML) of past identified events.

The present disclosure may offer a variety of benefits such as increased inspectability, sustainability, preventative maintenance, and informational preparedness in addition to local environmental benefits. Increased inspectability results from the ability to conduct inspections in a greater number of locations and in varying biomes; given the ability to automate aspects of the present disclosure, increased quality and speed may be achieved, costs may be reduced, and coverage area may be increased. The appearance of non-native and invasive species may be identified and dealt with more quickly, including in areas that humans have not visited in person, which may also be monitored for non-native and invasive species. Experts, authorities, and other interested parties may use the present disclosure to counter and reduce risks associated with the introduction of non-native and invasive species to a biome. Communities may benefit by avoiding local environmental impacts which might have otherwise resulted in heath and economic crises.

The present disclosure includes the proactive detection of invasive species a biome using information from social networks, devices (such as satellites and drones), and databases (such as those maintained by college and environment agencies). The present disclosure may use the information for analysis to generate one or more alerts to interested parties (e.g., experts, local residents, and/or the regulatory agencies), and the alerts may include information about the non-native or invasive species as well as one or more recommendations for actions that can be taken for remediation and protection of the biome.

The present disclosure may be used in any number of ecosystems. For example, the present disclosure may be used in a river, in a desert, in a prairie, at high altitudes, or at low altitudes. The present disclosure may be used in any ecosystem which a non-native or invasive species may impact.

A system in accordance with the present disclosure may include a memory and a processor in communication with the memory. The processor may be configured to perform operations. The operations may include accepting ecosystem data and analyzing the ecosystem data. The operations may also include detecting, from the analyzing, a species in an environment. The operations may further include determining an impact of said species on said environment and notifying a user of said species and said impact of said species.

In some embodiments of the present disclosure, the operations may further include determining the impact exceeds a threshold, generating an environmental report about the impact of the species, and submitting the environmental report to the contact. In some embodiments, the operations may further include developing at least one remediation recommendation and transmitting the remediation recommendation to the contact.

In some embodiments of the present disclosure, the operations may further include determining the data passes a details check threshold.

In some embodiments of the present disclosure, analyzing the ecosystem data includes comparing the ecosystem data against reference data in a database.

In some embodiments of the present disclosure, the operations may further include determining the data fails to pass a details check threshold and collecting additional data. In some embodiments, the operations may further include dispatching a data collector. In some embodiments, the data collector may be a drone. In some embodiments, the data collector is a satellite, and dispatching the satellite means activating the satellite for the environment.

FIG. 1 illustrates a flow diagram 100 for detection in accordance with some embodiments of the present disclosure. At a start point 110, an impact analysis trigger crawler 112 is used. The impact analysis trigger crawler 112 may gather data from one or more sources. Some data sources for the impact analysis trigger crawler 112 may include, for example, an internet news portal, a government input portal, online forms (e.g., complaint forms and inquiry forms), social media comments, and the like. In some embodiments, the impact analysis trigger crawler 112 may be a background application that indexes the gathered data.

Information from the impact analysis trigger crawler 112 may be cross-checked with one or more databases via an impact analysis data crawler 114. The databases may include databases maintained by government entities such as the United States Center for Disease Control (CDC), academic institutions such as the Federal University of Minas Gerais (UFMG), commercial enterprises such as Elsevier (which publishes the Ei Compendex bibliographic database), and other institutions and experts.

Such databases may include various data such as, for example, historical regional measurements as well as current regional measurements. Such measurements may include, for example, data collected by measurement equipment (e.g., weather data such as temperature and humidity) as well as other sensors (e.g., a photographic visual of the amount of foliage visible in satellite images).

A details check 120 may be performed to identify whether additional details are desired and/or necessary to identify the impact on the ecosystem. If additional details are desired and/or necessary, a data collector may be dispatched 122 to collect the additional information. The data collector may be, for example, a drone and/or an individual equipped to collect specific and/or general data such as temperature, humidity, images, numerical density of one or more species (native and/or non-native), and the like. The data collector may be more than one entity; for example, multiple drones, a group of biologists, other information collectors, or a combination thereof may be sent to gather the information.

In some embodiments, data collectors may be dispatched 122 by triggering equipment on site or having the site within their purview to activate and collect the desired information. For example, if weather-related information is desired (e.g., temperature and/or humidity) and an affiliated weather station is on site, information may be requested from the weather station for the site. Similarly, if a satellite with photographic capabilities is or may be trained on the area, the satellite may be calibrated (if desired/necessary) to take photographs of the area, take pictures, and submit the images to the relevant database for inspection.

In FIG. 1, data collection A 118 is shown as originating from dispatched 122 data collection. In some embodiments, data collection A 118 may be independent of dispatched 122 data collection; for example, data collection A 118 may be automated such that a drone is automatically dispatched 122 to collect information if a certain threshold is achieved, a user may manually launch a drone preemptively to collect additional information, a person could investigate an observation, or the like.

If the details check 120 indicates that additional details are not desired and/or necessary, the impact may be identified 128 and an impact check 130 may be performed to determine whether the impact to the ecosystem requires imminent attention. Various thresholds may be set according to the needs and preferences of the experts in the respective ecosystems, the users of the present disclosure, or some combination thereof. Thresholds may be set at variable levels; for example, thresholds may be set such that one thousand of a particular invasive species in a specified region would have a "low" impact on the ecosystem during one season while during another season it would have a "high" impact on the same ecosystem.

If the impact check 130 indicates that the impact on the ecosystem is not imminent, experts may be contacted 132. Additional information may be requested from the experts, and/or the experts may be tasked with evaluating the situation to enable further action if desired and/or necessary.

If the impact check 130 indicates that the impact on the environment is imminent, an environmental report may be issued 140. The environmental report may be submitted to authorities, experts, and/or others with an interest in the environmental report such that they are notified 142 of the situation.

In FIG. 1, if the experts are contacted 132 or if the authorities and/or experts are notified 142, then the cycle may complete by returning to a neutral state B 148. The neutral state B 148 may be described as the phase in which the process has completed, is dormant, is not ongoing, has not yet started or restarted, or similar. From neutral state B 148, the process may restart by returning to the start point 110.

In some embodiments, the experts may be contacted 132 or the authorities and/or experts are notified 142 which then results in data collection A 118 such that updated and/or additional information may be submitted to the system. The data crawler 114 may use that information to cross-check the databases with the updated and/or additional information. A details check 120 may be performed, and a data collector may be dispatched 122 and/or impact analyses may be performed. The experts providing additional and/or updated information may thus result in another impact check 130. Experts may again be contacted 132 and/or an environmental report may be issued 140. The environmental report may be sent to authorities and/or experts such that the authorities and/or experts are notified 142 of the situation.

In a use case employing an embodiment of the invention, a trigger data crawler (e.g., impact analysis trigger crawler 112) may be triggered by posts on social networks reporting invasive species in the Rio Doce in the city of Marliéria in the state of Minas Gerais of Brazil. The data crawler 114 may cross check this information with a database from the Federal University of Minas Gerais (UFMG), information from sensors in the region, and/or satellite images of the region to verify the probability of invasive species in the Rio Doce. If additional details are desired, a drone or other data collector may be dispatched to collect additional details. For example, an underwater drone may be sent to collect more information in the Rio Doce; the underwater drone may collect images from the river of fish, wildlife, and/or other aspects of the ecosystem.

In such a use case, the impact may be identified 128 by using image recognition and artificial intelligence (AI) to identify images of invasive species. For example, invasive fish species like tilapia (native to Africa, but not the Rio Doce) and carp (native to Asia, but not the Rio Doce) may be identified using AI image recognition. The system may calculate the number and/or population density of the invasive fish and the impact these fish may cause on the Rio Doce and the environment. If the impact is low, an evaluation by a biologist may be scheduled to propose a recommendation for how to address the situation. If it is identified that the impact of this invasive species is high, a report may be issued with the information about the invasive species and recommendations for how to address the situation. The report may then be forwarded to environmental agencies (e.g., government authorities) so that remedial action may be taken. Universities may also be notified (e.g., by sending a "high importance" email containing the environmental report to professors and/or other experts in the respective biology departments) so that researchers may assist in the process of containing the growth of invasive species.

The present disclosure may be used in a number of environments at various scales to detect numerous impact concerns. For example, in some embodiments, the present disclosure may be utilized in a one-mile stretch of river in a rainforest; in some embodiments, the present disclosure may be used to identify invasive species in the entire rainforest; in some embodiments, the present disclosure may be used to identify potential problems in the entire rainforest by extrapolating from data collected in a one-mile stretch of forest in that rainforest.

Other environments may similarly benefit from the implementation of the present disclosure. For example, in some embodiments, the present disclosure may be used to identify invasive species in a desert. In some embodiments, the present disclosure may be used to identify invasive species on the windward side of a mountain and extrapolate how that is likely to impact the ecosystem on the leeward side of the mountain; in some embodiments, the present disclosure may be used to identify changes on the leeward side of the mountain and calculate likely changes to the windward side of the mountain.

Figure 2:
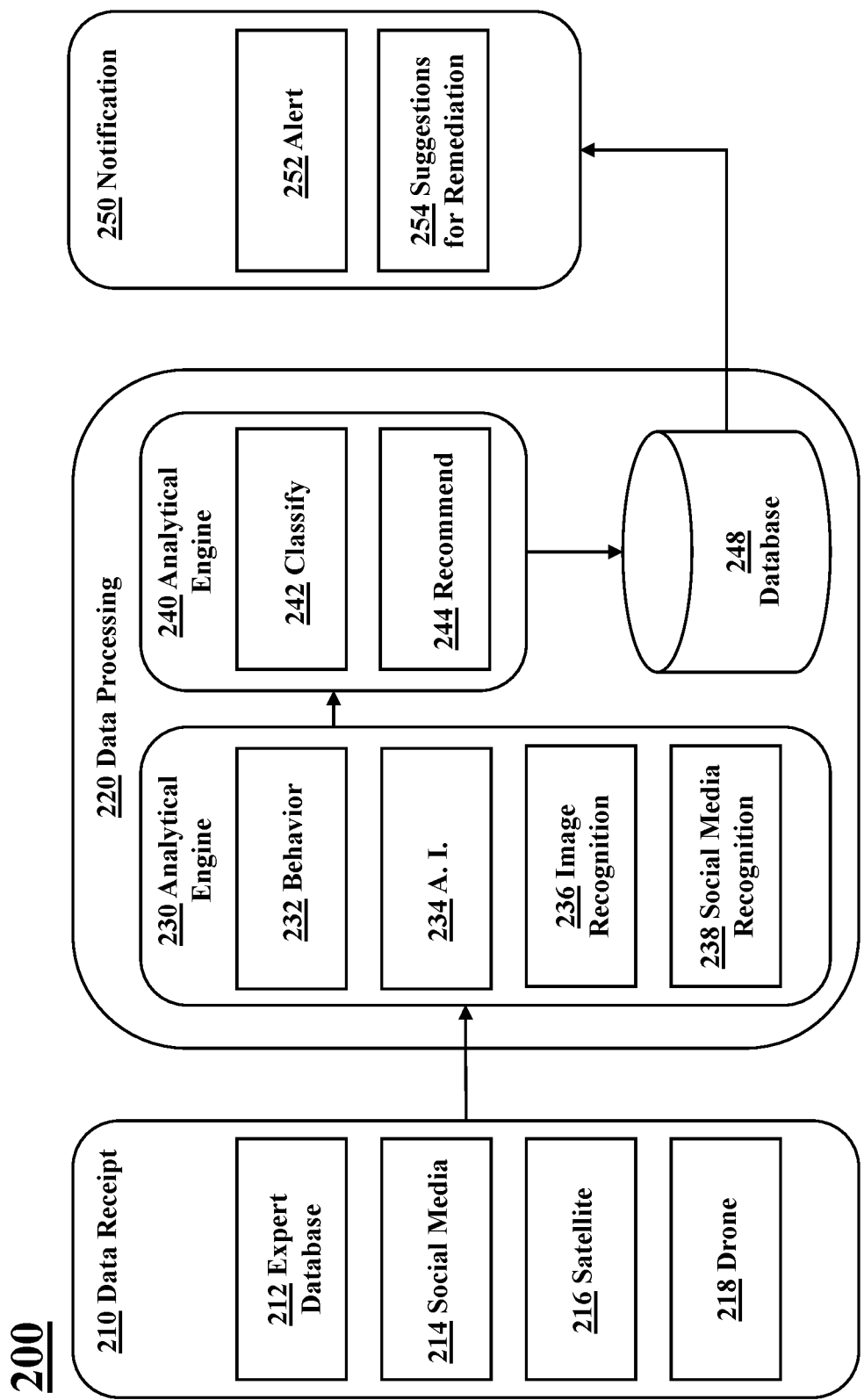
FIG. 2 depicts a system for detection and remediation in accordance with some embodiments of the present disclosure.

FIG. 2 depicts a system 200 for detection and remediation in accordance with some embodiments of the present disclosure. Data may be received 210 from one or more sources. Sources may include expert and research databases 212, social media 214, satellites 216, and/or drones 218. An expert database 212 may be, for example, a database maintained by an academic group (e.g., a university or other collection of scholars), a governmental agency (e.g., a scientific commission or an environmental agency), a corporate entity (e.g., a scientific publishing group or a research department of a company), or the like. Such databases may provide information about native species of each region, analysis inputs to identify if a species is native to the current location, and, if the species is not native to the location, which location is the natural habitat and habits of the species which may be analyzed to develop an action plan to mitigate any potential issues.

A social media 214 source may include, for example, inputs from users of a social media platform such as likes, comments, posts, and cross-posts. News related to environmental changes may be derived from posts by identifying a public post with environment-related information and distilling the information therefrom. For example, one or more users in a certain region posting about the river appearing greener and murkier than usual may trigger an inquiry such that results in (automatically) dispatching a drone to collect data about the phenomenon (such as is shown in FIG. 1 in which the dispatched 122 data collector is sent to collect additional information).

A satellite 216 source may be, for example, a satellite 216 trained on the relevant region, or one that otherwise has the relevant region in its purview. A satellite 216 source may provide, for example, photographic imagery of the area, thermographic maps of the area, or other information. Satellite 216 images may be used to provide maps as reference to facilitate analysis of flora changes, for example, by comparing current images of the local flora being analyzed to images from a previous time.

A drone 218 source may be, for example, a personal device for generalized use, a professional machine designed and built for a specific information-gathering purpose, or similar device capable of capturing and transmitting data. In some embodiments, the drone 218 may be dispatched (e.g., the dispatched 122 data collector of FIG. 1) specifically to collect data for use in surveilling or otherwise gathering information about a detected invasive species. In some embodiments, the drone 218 may be used for general information gathering about the ecosystem such as the state of an ecosystem not facing any invasive species or observable changes to the ecosystem since an invasive species was detected.

The drone 218 may be aerial, land-roving, or aquatic. Aerial drones may, for example, be used for an initial analysis of the environment. Aerial drones may be used to analyze recent changes not detectable via other means such as, for example, satellite 216 imagery. Aquatic drones may provide inputs of river analysis, such as by measuring for composition changes in the water of the river. Drone 218 (or multiple drones) may also be used to capture photographic images of various species within the target environment.

Data that has been received 210 may be processed 220. An analytical engine 230 may be used to synthesize data. Analysis may include, for example, behavioral analysis 232, AI analysis 234, image recognition processes 236, social media recognition 238, and other analyses as will be recognized by those skilled in the art.

Context may be used to weigh differing information and suggest the best or most probable answers. For example, if a sample of water from one location in a river has a different salinity than a sample taken from another location in the same river, the context may be analyzed to determine that one of the areas of the river is prone to salination build-up due to its unique geographical features. Another analytical engine 240 may be used to classify 242 observations and recommend 244 actions if desired and/or necessary. For example, the system may classify 242 that the salination difference in the aforementioned example is due to an increase in an invasive species population and may recommend 244 removal of the invasive species to prevent certain changes in the environment. Information from the analytical engines 230 and 240 may be submitted to a database 248 for use and/or storage.

The reasoning for the recommendation may or may not be included, for example, in a notification 250 to users such as authorities, environmental agencies, biologists, universities, local residents, and the like. A notification 250 may include, for example, an alert 252 that an invasive species has been detected, information about the invasive species, the likely impact(s) that the species will have on the ecosystem if the population is left unchecked, and suggestions 254 for remediation. Suggestions 254 may include, for example, removal of the invasive species, launch of a public awareness campaign, or other measures.

Figure 3:
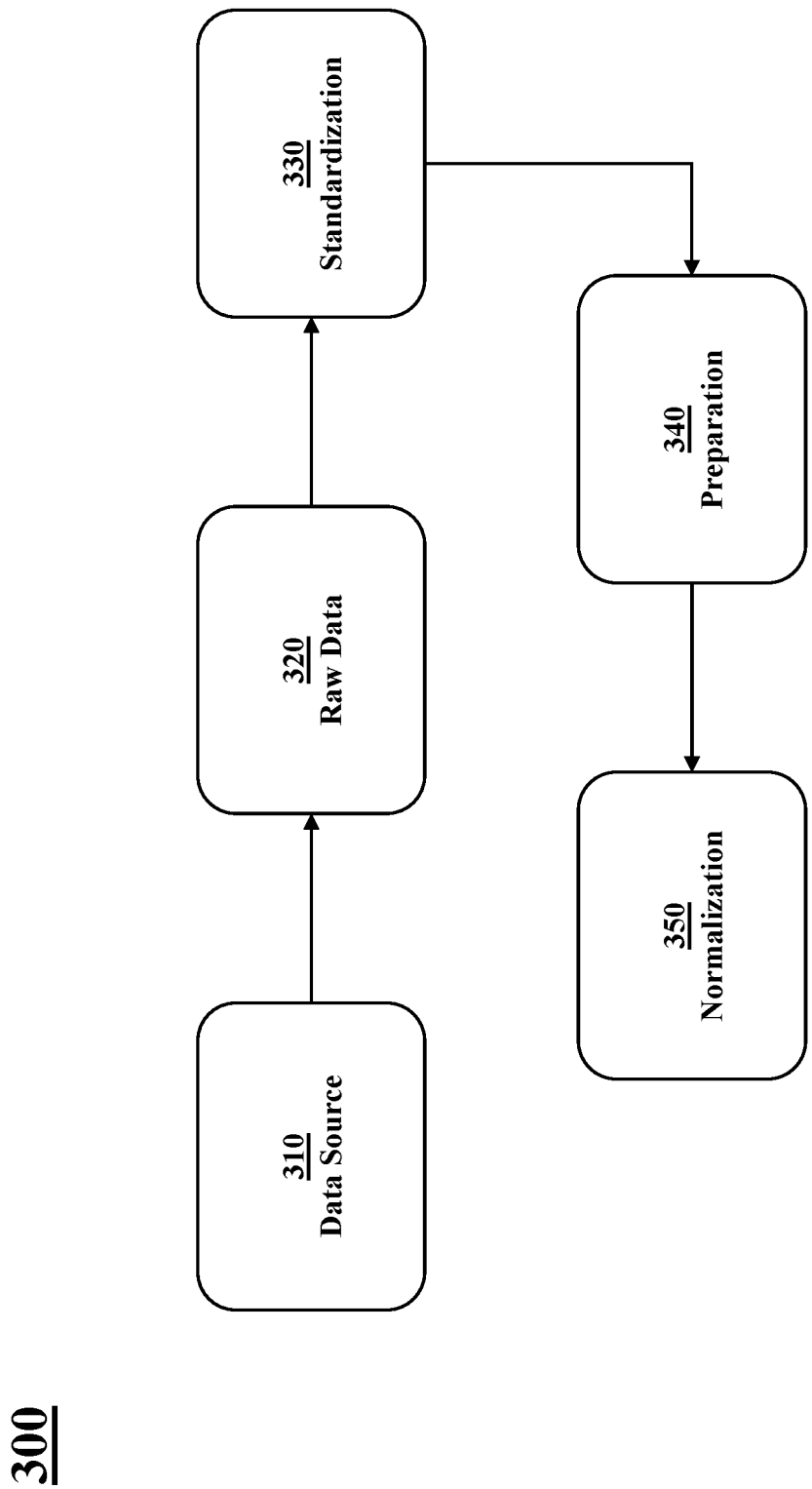
FIG. 3 illustrates data normalization in accordance with some embodiments of the present disclosure.

FIG. 3 illustrates a data normalization process 300 in accordance with some embodiments of the present disclosure. Data collected from various devices and data sources 310 may have different formats, strategy of formation, or analysis techniques; using the data normalization process 300 may enable the adaptation of raw data 320 into a uniform format acceptable to a system which may use the information, such as, for example, the system 200 for detection and remediation as shown in FIG. 2.

Multiple agents (e.g., collectors, crawlers, et cetera) may collect data from data sources 310. Normalizing the data helps in data analysis by enabling the analysis to be based on consistent information collected (e.g., compiled data uses uniform units and/or sample sizes). Raw data 320 from a data source 310 may be standardized 330 such that the standardized 330 data may be used by the system. Standardized 330 data may checked for inconsistency or insufficiency during preparation 340 which may result in prepared data. Prepared data may be readied as categorical values for processing in the normalization 350 of the data.

Figure 4:
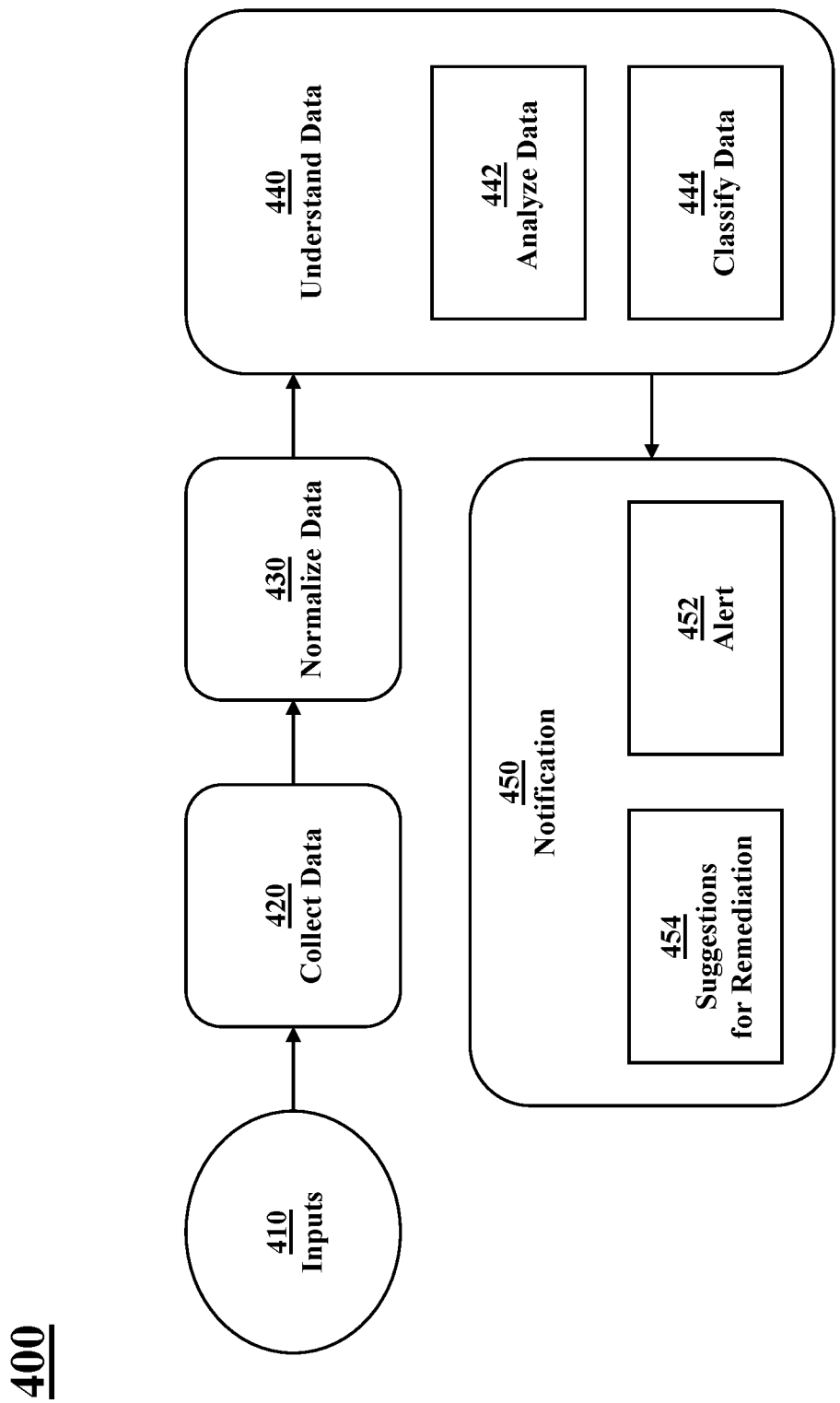
FIG. 4 depicts a method of detection in accordance with some embodiments of the present disclosure.

FIG. 4 depicts a method 400 of detection in accordance with some embodiments of the present disclosure. One or more inputs 410 may be used to collect 420 data. The collected data may then be normalized 430 and submitted for comprehension. Normalized 430 data may be submitted to, for example, an analytical engine 240 as shown in FIG. 2. Data may be understood 440 by, for example, analyzing 442 and classifying 444 the data. The understood 440 data may then be used to send a notification 450. The notification 450 may include, for example, an alert 452 about an invasive species as well as suggestions 454 for remediation.

An alert 452 about the invasive species may include, for example, what the invasive species is, what impacts the species may have on the system, the population density of the invasive species, habits of the invasive species, potential food sources of the invasive species, et cetera. Suggestions 454 for remediation may include, for example, removal of the invasive species, launch of a public awareness campaign, and the like.

In one embodiment, information may be collected and cross-checked using social media, satellite images, drone data, and environmental agency, university, and organization databases. Upon identifying a positive report of unexpected, non-native, and/or invasive species in a river, an analysis may occur. The analysis processes may include analyzing satellite images of the locality to evaluate any environment changes. Sensors may be used to check climate or weather-pattern changes (e.g., unexpected flooding in the area). Sensors may be used to identify animal behaviors changes (e.g., native species being migrating to other areas). Collected information may be correlated with environment agency data to identify other species in or near the area. Aerial drones may collect images for detailed images of the locality, and aquatic drones may collect images to identify species in one or more impacted rivers.

The inputs (e.g., inputs 410 in FIG. 4) from the data sources (e.g., data source 310 in FIG. 3) may be stored and analyzed in ML systems which may be identified as intelligent systems. These ML systems may identify the positive alert and process the data in order to classify the impact level of the alert. For example, in some embodiments, a four-tier classification system may be used such that a non-native or invasive species is identified as having no, minor, medium, or high impact on or risk to an ecosystem. A four-tier classification may include a no risk tier, a minor risk tier, a medium risk tier, and a high risk tier. An exemplary four-tier classification is further described herein.

If a non-native or invasive species is identified as having no risk, it is not identified impact to the environment or affirmatively identified as not having impact on the environment In such a scenario, a system (e.g., a system 200 for detection and remediation as shown in FIG. 2) may emit a notification without including other information such as, for example, an environmental report and/or remediation suggestions. Action (e.g., remediation) may not be required or recommended.

If a non-native or invasive species is identified as having minor risk or impact on the ecosystem, an invasive species may be identified but the species does not impact (or impacts mildly) the local ecosystem. Based on one or more analyses made by intelligent systems using all collected data, the invasive species is identified as not native but does not offer risks (or offers insignificant risks) to the environment. For example, an invasive species may be considered a minor risk if it is not predator for the native species current living on that area. The situation may be documented on a database (e.g., database 248 of FIG. 2) and a notification may be sent out to biologists for their awareness.

If a non-native or invasive species is identified as having medium risk, the species is identified as being an invasive species that can impact the local area. Based on one or more analyses made with intelligent systems using the collected data, the invasive species may be identified as capable of modifying the environment in the immediate area, but no current problems are identified. For example, a medium risk non-native or invasive species may be identified as a species that is a predator of native wildlife as predation of native wildlife can impact the local food chain. An alert may be sent to authorities (such as individuals in governmental environment agencies) and experts (such as research and/or academic biologists) with detailed information. A possible action plan to remediate the situation may also be submitted with the alert. The action plan may have been generated by one or more intelligent systems.

If a non-native or invasive species is identified as having major risk to the ecosystem, the species is identified as an invasive or non-native species that can impact both the local environment as well as the environment outside of the local area. Immediate action may be necessary to prevent harm to the environment. Based on one or more analyses made by intelligent systems using the collected data, an invasive species capable of modifying both the local and the regional environment (and perhaps beyond) may be identified. Large-scale problems may occur as a direct result of a major risk invasive species being present in the ecosystem; for example, the invasive species may eliminate one or more species of sub-aquatic life and destroy a key element of the local food chain. An alert may be sent to authorities and experts with detailed information about the invasive or non-native species, the current situation, and a possible remediation plan.

The present disclosure may make use of intelligent systems such as smart devices, AI, ML algorithms, cloud computing, and the like. Cloud computing may be useful in implementing the invention. It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment currently known or that which may be later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but the consumer has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software which may include operating systems and applications. The consumer does not manage or control the underlying cloud infrastructure but has control over operating systems, storage, and deployed applications, and the consumer possibly has limited control of select networking components (e.g., host firewalls).

Deployment models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and/or compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
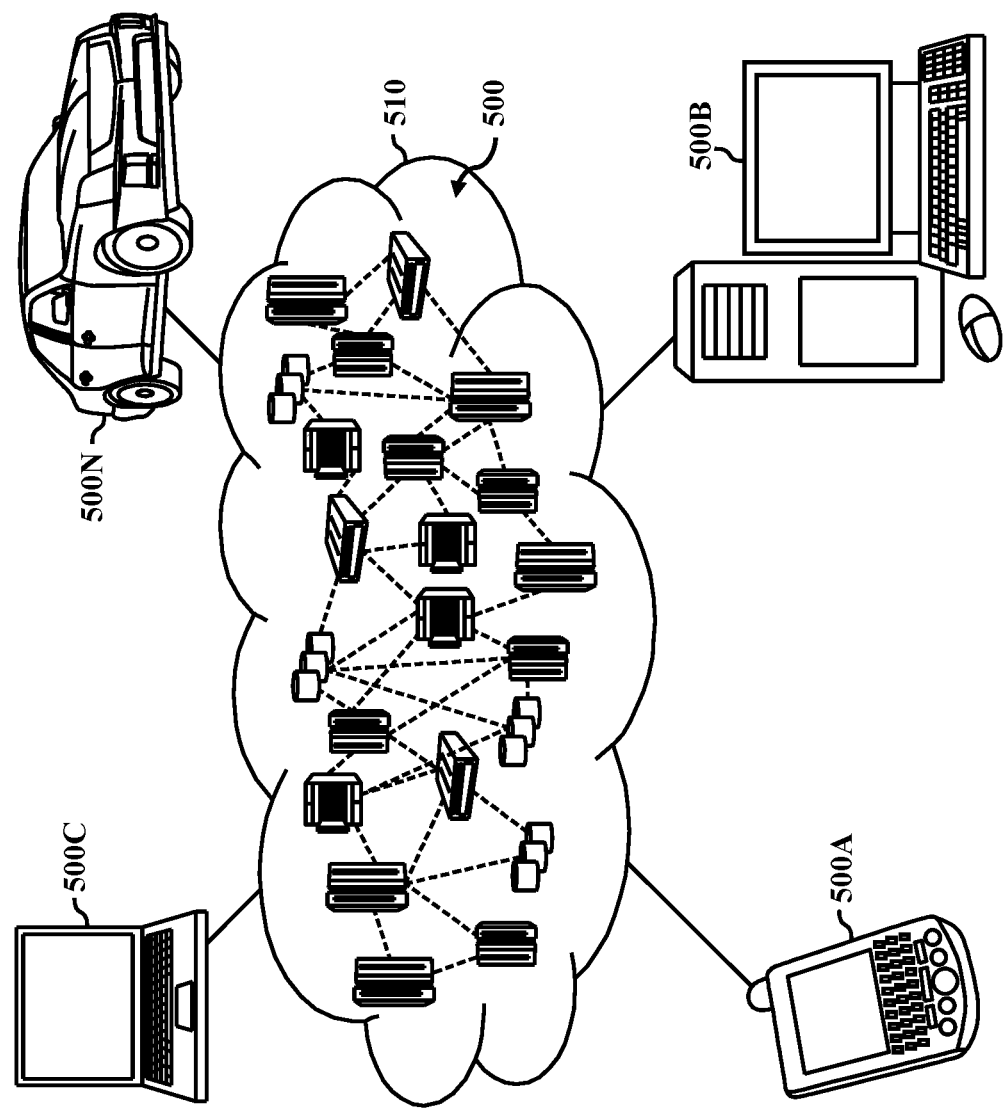
FIG. 5 illustrates a cloud computing environment, in accordance with embodiments of the present disclosure.

FIG. 5 illustrates a cloud computing environment 510 in accordance with embodiments of the present disclosure. As shown, cloud computing environment 510 includes one or more cloud computing nodes 500 with which local computing devices used by cloud consumers such as, for example, personal digital assistant (PDA) or cellular telephone 500A, desktop computer 500B, laptop computer 500C, and/or automobile computer system 500N may communicate.

Nodes 500 may communicate with one another. They may be grouped (not shown) physically or virtually, in one or more networks, such as private, community, public, or hybrid clouds as described hereinabove, or a combination thereof.

This allows cloud computing environment 510 to offer infrastructure, platforms, and/or software as services for which a cloud consumer does not need to maintain resources on a local computing device. It is understood that the types of computing devices 500A-N shown in FIG. 5 are intended to be illustrative only and that computing nodes 500 and cloud computing environment 510 can communicate with any type of computerized device over any type of network and/or network addressable connection (e.g., using a web browser).

Figure 6:
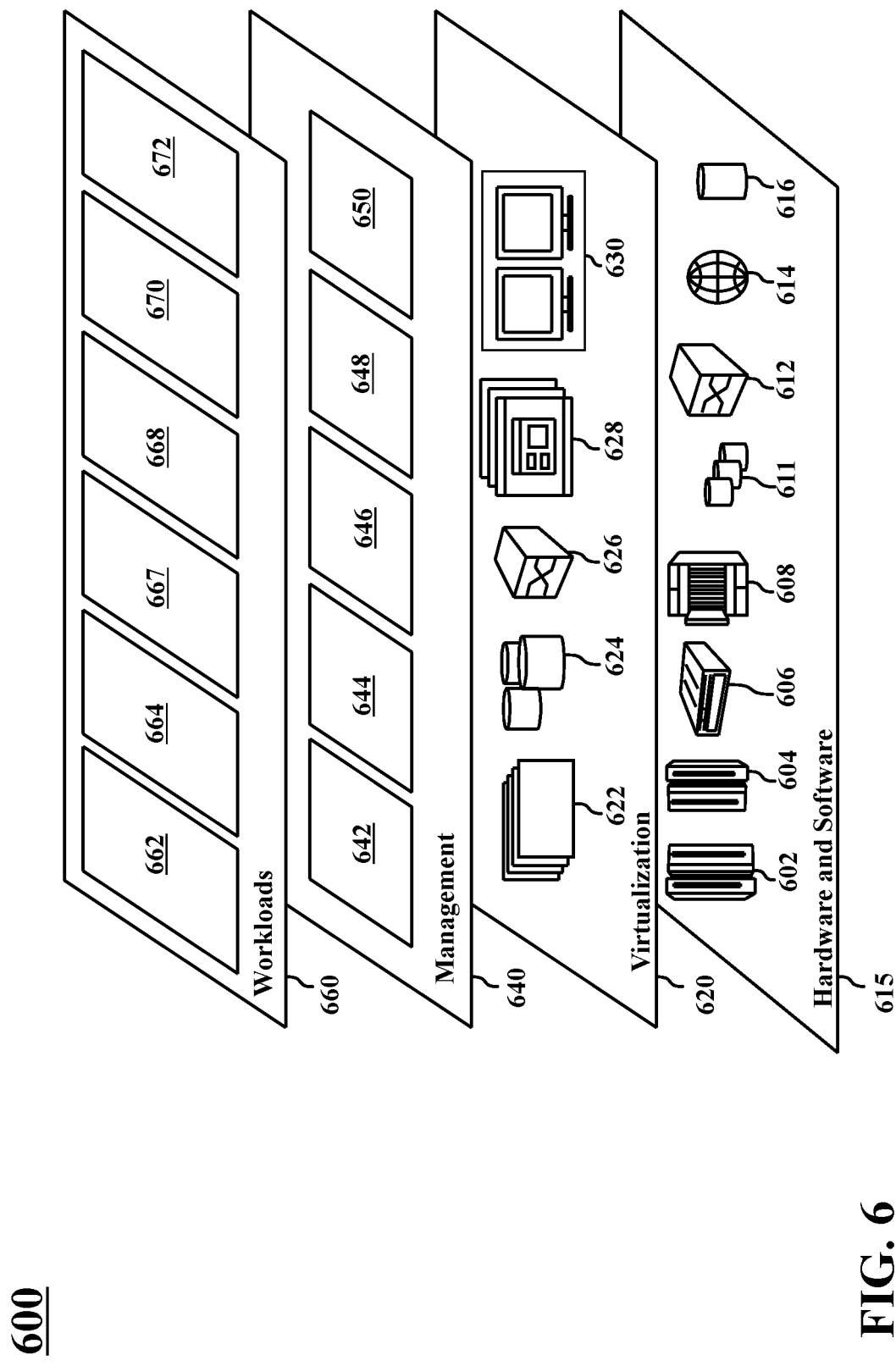
FIG. 6 depicts abstraction model layers, in accordance with embodiments of the present disclosure.

FIG. 6 illustrates abstraction model layers 600 provided by cloud computing environment 510 (FIG. 5) in accordance with embodiments of the present disclosure. It should be understood in advance that the components, layers, and functions shown in FIG. 6 are intended to be illustrative only and embodiments of the disclosure are not limited thereto. As depicted below, the following layers and corresponding functions are provided.

Hardware and software layer 615 includes hardware and software components. Examples of hardware components include: mainframes 602; RISC (Reduced Instruction Set Computer) architecture-based servers 604; servers 606; blade servers 608; storage devices 611; and networks and networking components 612. In some embodiments, software components include network application server software 614 and database software 616.

Virtualization layer 620 provides an abstraction layer from which the following examples of virtual entities may be provided: virtual servers 622; virtual storage 624; virtual networks 626, including virtual private networks; virtual applications and operating systems 628; and virtual clients 630.

In one example, management layer 640 may provide the functions described below. Resource provisioning 642 provides dynamic procurement of computing resources and other resources that are utilized to perform tasks within the cloud computing environment. Metering and pricing 644 provide cost tracking as resources and are utilized within the cloud computing environment as well as billing or invoicing for consumption of these resources. In one example, these resources may include application software licenses. Security provides identity verification for cloud consumers and tasks as well as protection for data and other resources. User portal 646 provides access to the cloud computing environment for consumers and system administrators. Service level management 648 provides cloud computing resource allocation and management such that required service levels are met. Service level agreement (SLA) planning and fulfillment 650 provide pre-arrangement for, and procurement of, cloud computing resources for which a future requirement is anticipated in accordance with an SLA.

Workloads layer 660 provides examples of functionality for which the cloud computing environment may be utilized. Examples of workloads and functions which may be provided from this layer include: mapping and navigation 662; software development and lifecycle management 664; virtual classroom education delivery 667; data analytics processing 668; transaction processing 670; and a system for detection of invasive species 672.

Figure 7:
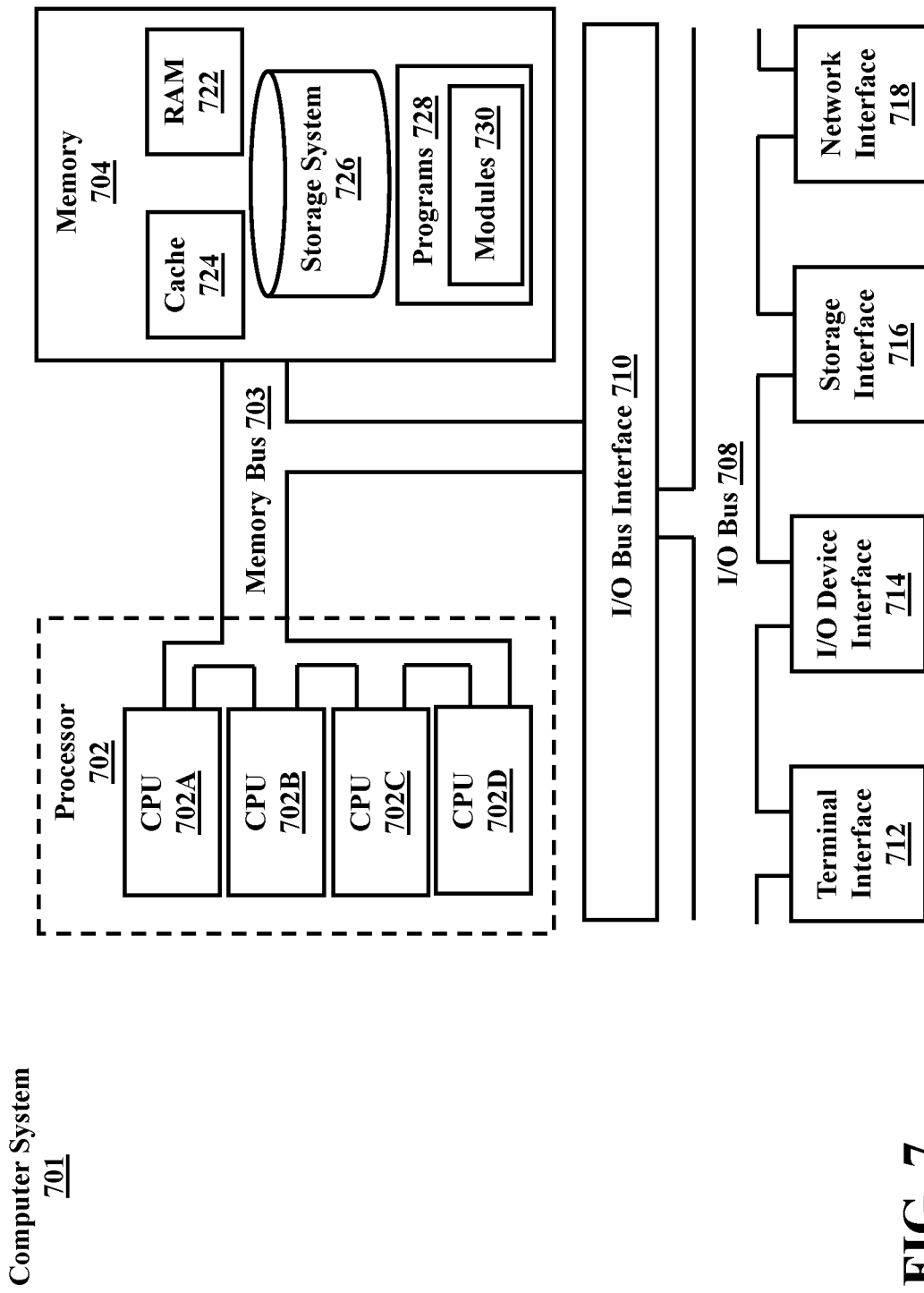
FIG. 7 illustrates a high-level block diagram of an example computer system that may be used in implementing one or more of the methods, tools, and modules, and any related functions, described herein, in accordance with embodiments of the present disclosure.

FIG. 7 illustrates a high-level block diagram of an example computer system 701 that may be used in implementing one or more of the methods, tools, and modules, and any related functions, described herein (e.g., using one or more processor circuits or computer processors of the computer) in accordance with embodiments of the present disclosure. In some embodiments, the major components of the computer system 701 may comprise a processor 702 with one or more central processing units (CPUs) 702A, 702B, 702C, and 702D, a memory subsystem 704, a terminal interface 712, a storage interface 716, an I/O (Input/Output) device interface 714, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable CPUs 702A, 702B, 702C, and 702D, herein generically referred to as the CPU 702. In some embodiments, the computer system 701 may contain multiple processors typical of a relatively large system; however, in other embodiments, the computer system 701 may alternatively be a single CPU system. Each CPU 702 may execute instructions stored in the memory subsystem 704 and may include one or more levels of on-board cache.

System memory 704 may include computer system readable media in the form of volatile memory, such as random access memory (RAM) 722 or cache memory 724. Computer system 701 may further include other removable/non-removable, volatile/non-volatile computer system storage media. By way of example only, storage system 726 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM, or other optical media can be provided. In addition, memory 704 can include flash memory, e.g., a flash memory stick drive or a flash drive. Memory devices can be connected to memory bus 703 by one or more data media interfaces. The memory 704 may include at least one program product having a set (e.g., at least one) of program modules that are configured to carry out the functions of various embodiments.

One or more programs/utilities 728, each having at least one set of program modules 730, may be stored in memory 704. The programs/utilities 728 may include a hypervisor (also referred to as a virtual machine monitor), one or more operating systems, one or more application programs, other program modules, and program data. Each of the operating systems, one or more application programs, other program modules, and program data, or some combination thereof, may include an implementation of a networking environment. Programs 728 and/or program modules 730 generally perform the functions or methodologies of various embodiments.

Although the memory bus 703 is shown in FIG. 7 as a single bus structure providing a direct communication path among the CPUs 702, the memory subsystem 704, and the I/O bus interface 710, the memory bus 703 may, in some embodiments, include multiple different buses or communication paths, which may be arranged in any of various forms, such as point-to-point links in hierarchical, star, or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units 710 are shown, which separate the I/O bus 708 from various communications paths running to the various I/O devices, in other embodiments some or all of the I/O devices may be connected directly to one or more system I/O buses 708.

In some embodiments, the computer system 701 may be a multi-user mainframe computer system, a single-user system, a server computer, or similar device that has little or no direct user interface but receives requests from other computer systems (clients). Further, in some embodiments, the computer system 701 may be implemented as a desktop computer, portable computer, laptop or notebook computer, tablet computer, pocket computer, telephone, smartphone, network switches or routers, or any other appropriate type of electronic device.

It is noted that FIG. 7 is intended to depict the representative major components of an exemplary computer system 701. In some embodiments, however, individual components may have greater or lesser complexity than as represented in FIG. 7, components other than or in addition to those shown in FIG. 7 may be present, and the number, type, and configuration of such components may vary.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide, or other transmission media (e.g., light pulses passing through a fiber-optic cable) or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN) or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although the present disclosure has been described in terms of specific embodiments, it is anticipated that alterations and modification thereof will become apparent to the skilled in the art. The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or the technical improvement over technologies found in the marketplace or to enable others of ordinary skill in the art to understand the embodiments disclosed herein. Therefore, it is intended that the following claims be interpreted as covering all such alterations and modifications as fall within the true spirit and scope of the disclosure.

What is claimed is:

1. A system, comprising:
    a processor that when executing instructions stored in an associated memory is configured to:
        receive, from an online data source, ecosystem data associated with an ecosystem of an environment;
        analyze the ecosystem data;
        detect a species in the environment based on the analysis;
        cross-check the ecosystem data with a remote data source that is different than the online data source to identity a probability that the species is an invasive species and to determine whether additional ecosystem data is required;
        in response to an identification that the species is invasive, identify a severity of an impact of the species on the environment;
        identify a type of intervention based on the severity, wherein different severity levels are associated with a corresponding different type of intervention; and
        notify a user of the species, the type and severity of the impact, and the type of intervention.

2. The system of claim 1, wherein the processor is further configured to:
    determine that the impact exceeds a threshold;
    cause the system to generate a report about the impact of the species; and
    submit the report to a user.

3. The system of claim 2, wherein the processor is further configured to:
    develop a recommendation to remediate the impact at least one remediation recommendation; and
    transmit the recommendation to the user.

4. The system of claim 1, wherein, when the processor cross-checks the ecosystem data, the processor is further configured to:
    compare an amount of details of the ecosystem data to a threshold; and
    collect additional ecosystem data when the amount of details is less than the threshold.

5. The system of claim 4, wherein the processor is further configured to:
    automatically dispatch a data collector to collect the additional ecosystem data.

6. The system of claim 5, wherein the data collector is a satellite.

7. The system of claim 1, wherein, when the processor is configured to analyze the ecosystem data, the processor is further configured to:
    compare the ecosystem data ecosystem data against reference data in a database.

8. A method, comprising:
    receiving, from an online data source, ecosystem data associated with an ecosystem of an environment;
    analyzing the ecosystem data;
    detecting a species in the environment based on the analyzing;
    cross-checking the ecosystem data with a remote data source that is different than the online data source to identity a probability that the species is an invasive species and to determine whether additional ecosystem data is required;
    in response to identifying that the species is invasive, identifying a type and a severity of an impact of the species on the environment;
    identifying a type of intervention based on the severity, wherein different severity levels are associated with a corresponding different type of intervention; and
    notifying a user of the species, the type and severity of the impact, and the type of intervention.

9. The method of claim 8, further comprising:
    determining that the impact exceeds a threshold;
    generating a report about the impact of the species; and
    submitting the report to a user.

10. The method of claim 9, further comprising:
    developing a recommendation to remediate the impact; and
    transmitting the recommendation to the user.

11. The method of claim 8, wherein the cross-checking the ecosystem data further comprises:
    comparing an amount of details of the ecosystem data to a threshold; and
    collecting additional ecosystem data when the amount of details is less than the threshold.

12. The method of claim 11, further comprising:
    dispatching a data collector to collect the additional ecosystem data.

13. The method of claim 12, wherein the data collector is a satellite.

14. The method of claim 8, wherein, the analyzing the ecosystem data further comprises:
  comparing the ecosystem data ecosystem data against reference data in a database.

15. A nontransitory computer readable medium comprising instructions that when executed by a processor cause the processor to perform:
  receiving, from an online data source, ecosystem data associated with an ecosystem of an environment;
  analyzing the ecosystem data;
  detecting a species in the environment based on the analyzing;
  cross-checking the ecosystem data with a remote data source that is different than the online data source to identity a probability that the species is an invasive species and to determine whether additional ecosystem data is required;
  in response to identifying that the species is invasive, identifying a type and a severity of an impact of the species on the environment;
  identifying a type of intervention based on the severity, wherein different severity levels are associated with a corresponding different type of intervention; and
  notifying a user of the species, the type and severity of the impact, and the type of intervention.

16. The nontransitory computer readable medium of claim 15, wherein the instruction further cause the processor to perform:
  determining that the impact exceeds a threshold;
  generating a report about the impact of the species; and
  submitting the report to a user.

17. The nontransitory computer readable medium of claim 16, wherein the instruction further cause the processor to perform:
  developing a recommendation to remediate the impact; and
  transmitting the recommendation to the user.

18. The nontransitory computer readable medium of claim 15, wherein the cross-checking the ecosystem data further comprises:
  comparing an amount of details of the ecosystem data to a threshold; and
  collecting additional ecosystem data when the amount of details is less than the threshold.

19. The nontransitory computer readable medium of claim 18, wherein the instruction further cause the processor to perform:
  dispatching a data collector to collect the additional ecosystem data.

20. The nontransitory computer readable medium of claim 15, wherein, the analyzing the ecosystem data further comprises:
  comparing the ecosystem data ecosystem data against reference data in a database.

\* \* \* \* \*